(12) United States Patent
Robinson et al.

(10) Patent No.: US 7,345,723 B2
(45) Date of Patent: Mar. 18, 2008

(54) LC PANEL COMPENSATORS

(75) Inventors: Michael G. Robinson, Boulder, CO (US); Jianmin Chen, Superior, CO (US); Gary D. Sharp, Boulder, CO (US)

(73) Assignee: ColorLink, Inc., Boulder, CO (US)

( * ) Notice: Subject to any disclaimer, the term of this patent is extended or adjusted under 35 U.S.C. 154(b) by 447 days.

(21) Appl. No.: 10/908,671

(22) Filed: May 22, 2005

(65) Prior Publication Data

US 2005/0264734 A1 Dec. 1, 2005

Related U.S. Application Data

(60) Provisional application No. 60/573,910, filed on May 24, 2004.

(51) Int. Cl.
*G02F 1/1335* (2006.01)

(52) U.S. Cl. .................. 349/117; 349/119; 349/113

(58) Field of Classification Search ........... 349/117, 349/119, 113, 130
See application file for complete search history.

(56) References Cited

U.S. PATENT DOCUMENTS

| | | | |
|---|---|---|---|
| 4,536,063 A | 8/1985 | Southwell | |
| 5,472,538 A | 12/1995 | Minakuchi et al. | |
| 5,571,567 A | 11/1996 | Shah | |
| 5,751,384 A | 5/1998 | Sharp | |
| 5,888,603 A | 3/1999 | Fergason | |
| 5,990,996 A | 11/1999 | Sharp | |
| 6,004,417 A | 12/1999 | Roesch et al. | |
| 6,096,375 A | 8/2000 | Ouderkirk et al. | |
| 6,156,433 A | 12/2000 | Hatori et al. | |
| 6,362,862 B1 * | 3/2002 | Itoh et al. | 349/119 |
| 6,552,767 B1 * | 4/2003 | Kaneko | 349/119 |
| 6,603,523 B2 * | 8/2003 | Nakamura et al. | 349/119 |
| 6,667,784 B2 * | 12/2003 | Sharp et al. | 349/78 |

FOREIGN PATENT DOCUMENTS

WO    WO 00/07172    2/2000

OTHER PUBLICATIONS

International Search Report for co-pending PCT Application PCT/IB05/51683, mailed Mar. 23, 2006.

* cited by examiner

*Primary Examiner*—Mike Qi
(74) *Attorney, Agent, or Firm*—Baker & McKenzie LLP

(57) ABSTRACT

Described are various compensators for compensating for in-plate and out-of-plane retardances of LC panels in their dark states.

11 Claims, 5 Drawing Sheets

LC PANEL COMPENSATORS

CROSS-REFERENCE TO PRIOR APPLICATIONS

This application claims priority to U.S. provisional patent application Ser. No. 60/573,910, filed May 24, 2004, entitled "Polarization Compensating Elements Using Durable, Low Elasticity Organic Substrates," which is hereby incorporated by reference herein.

TECHNICAL FIELD

Disclosed embodiments herein relate to optical devices for use in liquid crystal (LC) display systems, and more particularly to reflective liquid crystal on silicon (LCoS) projection architectures that require panel-only compensation. These embodiments represent optical components that consist of one or more birefringent layers that compensate for residual in-plane and out-of-plane retardation present in the OFF-state of an LC panel. The net retardation of the panel ($=\Delta n \cdot d$) is then substantially the vector sum of the two retardance components. When reduced to practice with stretched organic polymer films, these components typically demand high durability and high polarization performance, and as such a low-elasticity organic substrate is preferred, as described in the preceding provisional U.S. patent application Ser. No. 60/573,910, which is hereby incorporated by reference herein.

BACKGROUND

In projection displays using LCoS or other LC panels, there is a need to compensate residual, OFF-state panel retardance to ensure sufficient contrast performance, because such residual in-plane retardance applied to incident optical rays can cause polarization mixing and lead to OFF-state leakage. In the case of large screen televisions based on LC panel projection, this leakage manifests itself as a bright dark-state and one that is often colored. When displaying dark video content, such leakage is very obvious and undesirable. Removing residual OFF-state retardance of the LC panels, or at least its adverse affect, can be achieved by introducing birefringent elements in front of the panel, which was described by U.S. Patent Publication Ser. No. U.S. 2003/0128320, to Xiang-Dong Mi.

In general, compensators act first to remove residual in-plane OFF-state retardance of the panel, and second to reduce OFF-state light leakage due to the out-of-plane retardance which relates to field-of-view (FOV) performance of the LC layer. Removing the in-plane retardance is important, as it affects all incident light, since it corresponds to the extent to which the LC molecules are not aligned normal to the substrate or not balanced in their orientations when projected onto the panel plane. The substantial out-of-plane retardance alters the polarization state of off-axis rays, and acts to reduce the panel's field-of-view and in non-collimated systems leads again to OFF-state leakage. To get the high contrast demanded of current commercial video projection systems, both in-plane and out-of-plane compensation is desired.

SUMMARY

Certain disclosed compensation schemes may be used in reflective systems where the input/output beam separating PBSs do not require additional compensation (e.g., wire grid PBSs) or are compensated separately. Such systems provide that a linear polarization state exists prior to the system analyzer. Specifically, dark state light exiting the input/output beam-separating PBSs has the same linear polarization state as the light entering as a result of the orthogonal analyzing and polarization axes. In transmissive systems, the output analyzer orientation is independent of the polarizer and allows for compensation solutions that produce rotated linear output states.

Disclosed herein are embodiments addressing the compensating of a reflective LC panel with a compensator comprising at least one birefringent layer, where each birefringent layer or the collection of birefringent layers can exhibit uniaxial or biaxial properties. Specific cases include a- and c-plate combinations, single biaxial films, tilted c-plates, and bi-layer compensators comprising two uniaxial layers having their optic axes oriented substantially orthogonally with respect to each other. Compensation of transmissive panels can be achieved by related methods and are also covered by the general methodology of this patent by "unfolding" reflective designs. A stretched organic film may be used as the birefringent layer or layers in the described embodiments. To avoid degradation within the harsh environment of a projection system, compensators using these stretched organic films may be formed as an encapsulated laminate. An exemplary effective organic film is a low-elasticity polyolefin film.

DETAILED DESCRIPTION OF THE PREFERRED EMBODIMENTS

Figure 1A:
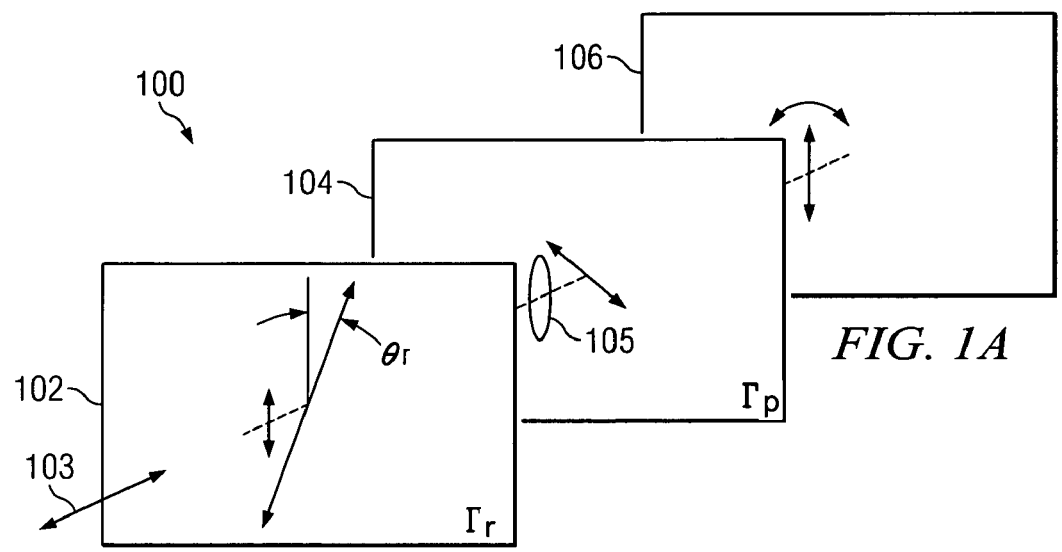
FIGS. 1a-b are optical block diagram of exemplary compensator and LC panel arrangements, showing for background purposes relative arrangement and orientations of compensators relative to LC panels.
Figure 1B:
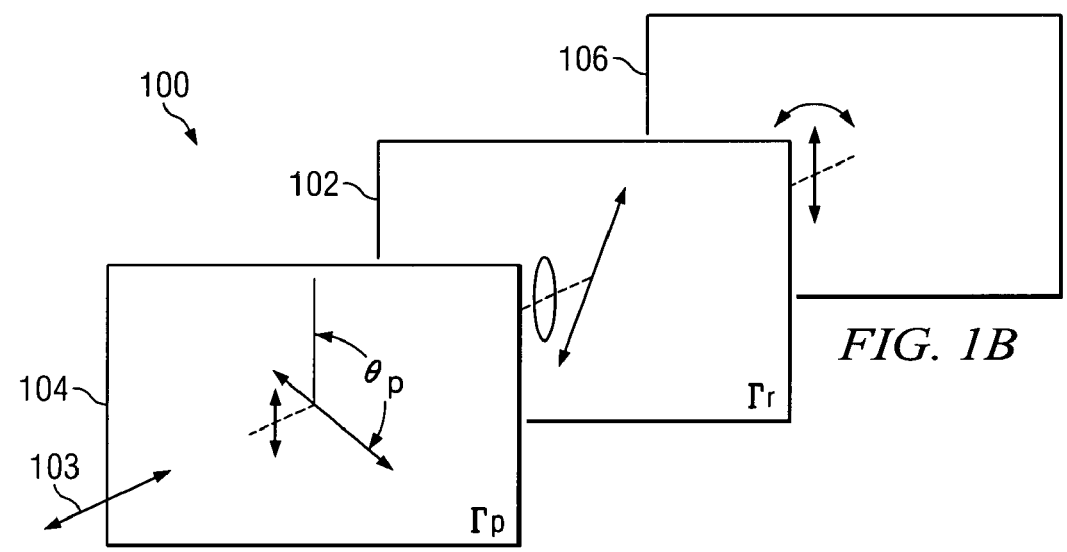

FIGS. 1a-b are optical block diagrams illustrating relative layouts and orientations of compensators relative to LC panels (comprising LC layers and reflectors) that they are compensating. In particular, FIG. 1a shows an optical system 100 comprising a compensator 102. Polarized light 103 impinges on the compensator 102, and is shown with a linear (vertical polarization). The compensator 102 has a certain optic axis orientation and in-plane retardance, θr and Γr, respectively, where θr is the orientation angle relative to the linear polarization of the polarized input light 103. Because of the polarization difference, the compensator imparts an elliptical polarization 105 to the light 103 incident on the LC layer 104. The elliptical polarization is configured such that it will compensate for the built-in residual in-plane retardance of the LC layer 104, such that the output from the LC layer 104 will be linearly polarized as it impinges upon the reflection plane 106. Along the reflective path, this process occurs in the reverse order, and the compensator 102 has been configured such that the output light 103 (along the same path as the input light) has the same linear polarization as the input light.

The optical system 100 of FIG. 1b operates in the same way as the optical system 100 of FIG. 1a, except that in FIG. 1b the compensator 102 is positioned between the LC panel 104 and the reflector 106, whereas in FIG. 1a it was positioned optically ahead of both of those elements. The compensator 102 of either FIG. 1a or FIG. 1b can accordingly be configured to compensate for the elliptical polarization imparted in the OFF-state by the LC panel 104, whether the compensator 102 is located between the LC panel 104 and reflector 106, as in FIG. 1b, or optically before both of those elements, as in FIG. 1a. In practice, placing the compensator 102 between the LC panel 104 and reflector 106 is seldom done, as usually the LC panel and reflector are packaged as a single component, and may often be described together as a reflective LC panel. It would be possible, however, to arrange the elements as described and shown in FIG. 1b. Mathematically, FIG. 1b is also a useful approximation for the more-common architecture of FIG. 1a, and that approximation holds particularly for small in-plane panel 104/106 and compensator 102 retardances. The less conventional arrangement of FIG. 1b therefore simplifies the matrix mathematics described below, and accordingly is also described herein. But, as mentioned, the matrix mathematics also accurately describe the more conventional arrangement of FIG. 1a for small in-plane panel 104/106 and compensator 102 retardances.

The above description of FIGS. 1a-b provides a background for understanding the developments and advancement of the present application, which includes specific approaches in which LC panels 104 can be compensated by compensating residual OFF-state in-plane retardance together with compensating off-axis polarization mixing caused by the panel's OFF-state out-of-plane retardance. In certain embodiments, this may be viewed as a sequential, two-step process as light passes through the system. But while there may be certain advantages in the order of compensation, and certain statements in the specification may seem to imply a certain order, the use of the described embodiments should not be construed to limit the scope of the claims. The claims alone may require certain orders or sequences of compensation, and as such only those claims specifically spelling out particular orders of compensation should be construed to be so limited.

Still referring to FIG. 1a, further described is an embodiment for compensating LC panels. In the embodiment shown, the LC panel includes both an LC material 104 and a reflective plane 106. The described embodiment involves first the matching and then negating the in-plane retardance of compensator (Γr) and panel (Γp). As described in the present application, exact matching of the retardances is not necessary, and in fact may be undesirable. The system specifically can be configured to compensate for the retardance mismatch between the compensator and the panel by changing the relative orientations between the panel 104/106 and the compensators 102. In the described embodiments, the compensation for the retardance mismatch can only be achieved where the compensator's 102 in-plane retardance exceeds the in-plane component of the panel's 104/106 dark-state retardance.

Although the present application describes the compensators 102 as being positioned outside the panels 104/106, it is also possible to place the compensators 102 "within" reflective panels 104/106, as is shown in FIG. 1b. Thus, in the FIG. 1b embodiment, the compensator is interposed between the LC material 104 and the reflective plane 106. As mentioned above, and as will be further described below, this application recognizes the advantage of having a substantial mismatch between compensator and panel retardances. Certain embodiments of this application accordingly describe approaches or designs that work effectively with the substantial mismatch in compensator and panel retardances.

More specifically, applicants have recognized that from a manufacturing or design stability standpoint, if the in-plane retardance of the compensator 102 (Γr) and the panel 104/106 (Γp) are well-matched, this matching may cause difficulties for maintaining the proper relative orientations. This is due to the sharp changes that can occur in optimal orientations when the retardances of the panel 104/106 and compensator 102 are relatively close. As described in the present application, relative orientations of the compensator 102 and the panel 104/106 can be adjusted to accommodate for differences between panel and compensator retardances. The relationship between the in-plane retardance mismatch, which is the difference between the panel's OFF-state in-plane residual retardance and the compensator's in-plane retardance, and the resulting optimal compensating orientation can be determined mathematically as is described herein.

With the described approach, polarization analysis is simplified because light having the same linear input and exit polarization states from any reflective birefringent network in an LC-panel-based light modulation system, with the LC-panel in its OFF-state, will have a linear polarization of arbitrary orientation at the reflecting interface. A compensator/panel combination creating linear polarization in a single pass—incident on the mirror/reflecting layer of the reflective LC panel—therefore represents an in-plane compensation solution. In mathematical terms, this condition may be expressed as $O = L \cdot C \cdot I$, where O and I are the output (mirror) and input linear polarizations and where C and L are the head-on transformations associated with the compensator and LC panel respectively. For small retardances, e.g., less than approximately 30 nm for optical systems handling visible light, these transformations can be reversed to give $O = C \cdot L \cdot I$.

Employing a Poincare sphere (see D. Goldstein, Polarized Light, at ch. 12 (2d ed. 2003), which is hereby incorporated by reference herein) as a means of representing and transforming polarizations, the above expression can be written as follows:

$$(0\ 0\ 1) \cdot \begin{bmatrix} \begin{pmatrix} \cos(2 \cdot \theta r) & \sin(2 \cdot \theta r) & 0 \\ -\sin(2 \cdot \theta r) & \cos(2 \cdot \theta r) & 0 \\ 0 & 0 & 1 \end{pmatrix} \cdot \\ \begin{pmatrix} 1 & 0 & 0 \\ 0 & \cos\left(\frac{2 \cdot \pi \cdot \Gamma r}{\lambda}\right) & -\sin\left(\frac{2 \cdot \pi \cdot \Gamma r}{\lambda}\right) \\ 0 & \sin\left(\frac{2 \cdot \pi \cdot \Gamma r}{\lambda}\right) & \cos\left(\frac{2 \cdot \pi \cdot \Gamma r}{\lambda}\right) \end{pmatrix} \cdot \\ \begin{pmatrix} \cos(2 \cdot \theta r) & -\sin(2 \cdot \theta r) & 0 \\ \sin(2 \cdot \theta r) & \cos(2 \cdot \theta r) & 0 \\ 0 & 0 & 1 \end{pmatrix} \end{bmatrix} \cdot$$

$$\begin{pmatrix} \cos(2 \cdot \varepsilon) \cdot \cos(2 \cdot \phi) \\ \cos(2 \cdot \varepsilon) \cdot \sin(2 \cdot \phi) \\ \sin(2 \cdot \varepsilon) \end{pmatrix} = 0$$

(Equation 1)

In this Equation 1, as discussed in Goldstein, supra, $\phi$ and $\varepsilon$ are the conventional orientation and ellipticity angles describing the polarized state transformed from the input polarization by the LC layer 104. $\Gamma r$ and $\theta r$ are the in-plane retardance and orientation of the compensator 102, and $\lambda$ is the wavelength of the compensated light. The output polarization is linear if it is orthogonal to the vector (0 0 1), hence the scalar product can be equated to zero in Equation 1.

Equation 1 can be solved to give the following expression relating compensator orientation as a function of retardance:

$$\theta r(\Gamma r) = \frac{1}{2} \cdot \mathrm{asin}\left(\frac{\tan(2 \cdot \varepsilon)}{\tan\left(\frac{2 \cdot \Gamma r \cdot \pi}{\lambda}\right)}\right) - \phi$$

(Equation 2)

For the specific case of a vertically aligned LCOS panel, the LC material 104 of the panel is aligned predominantly homeotropically in its low voltage OFF-state, but has a slight tilt (e.g., 7°) off-normal in the plane bisecting the polarizer/analyzer orientations. For typical LC thickness and birefringence, Equation 2 maps the input polarization state ($\phi$, $\varepsilon$)=(0°, 0°) onto the polarization state (0°, 1°), which would be consistent with approximately 3 nm of residual in-plane retardance at an input light wavelength of 550 nm.

Figure 2:
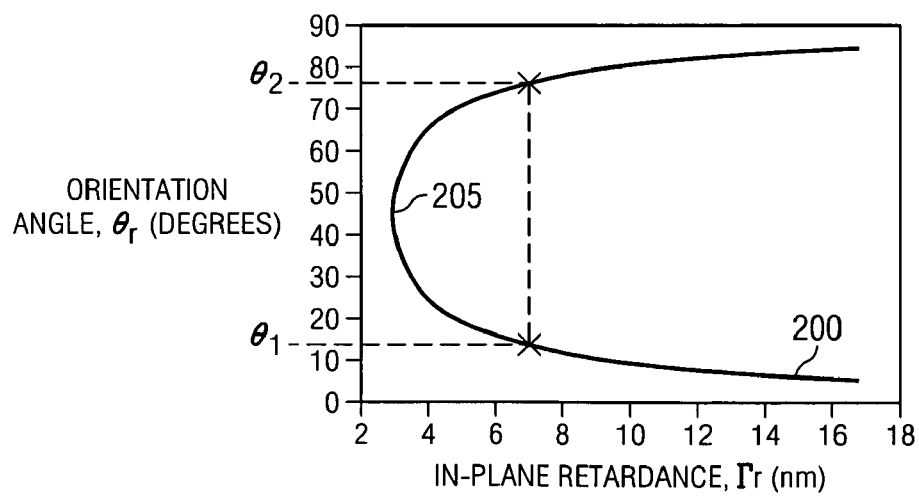
FIG. 2 is a graph of optimal compensator optic axis orientation as a function of net in-plane retardance for compensating an exemplary 3 nm residual vertically aligned LCOS panel.

FIG. 2 illustrates a resulting 'C' curve 202 of optimal compensator orientation (y-axis) as a function of in-plane retardance (x-axis) for the above Equation 2 when the residual retardance is 3 nm at an input wavelength of 550 nm. For each value of compensator retardance, there are two orientations ($\theta_1$, $\theta_2$) at which the residual in-plane retardance is compensated, where the orientations are related by $\theta_1 = 90° - \theta_2$. Thus for a given $\Gamma r$ ($>\Gamma p$), there are two possible compensator orientations given in FIG. 2. In the specific illustration of FIG. 2, the in-plane retardance is shown as an example at $\Gamma r \cong 7$ nm, which yields $\theta_1 \cong 15°$ and $\theta_2 \cong 75°$, and given the relatively flat slope of the C-curve 200 in this region, the solution would be relatively impervious to variations in the in-plane retardance values of the compensator 102 and/or LC panel 104/106. The flatter part of the C-curve exists in some of the described embodiments for $\Gamma r - \Gamma p >$ approximately 15 nm.

In cases where chromatic, non-collimated light is compensated, and perhaps in other embodiments, it is beneficial to choose the retarder's in-plane orientation that more closely aligns to the input polarization.

In further described embodiments of this application, applicants have recognized the advantage in choosing a compensator with an in-plane retardance value $\Gamma r$ that is mismatched, at least to a certain degree, from that of the panel $\Gamma p$ in its OFF-state. In particular, because of the steep slope of the C-curve near the 45° solution 205, where $\theta_1 \cong \theta_2 \cong 45°$, small variations in compensator or panel retardance in the 45° implementation can cause relatively dramatic shifts in the orientation solutions according to the illustrated C-curve of FIG. 2. For example, according to the graph, if in-plane retardance of the compensator shifts from 3 nm to approximately 3.2 nm, a shift in retardance of only approximately 7%, the proper orientation angle shifts approximately a full 10°, from 45° to 55°. Without adjusting the system to compensate for this shift in retardance, there could be a dramatic shift in system performance.

Moving away from the 45° solution 205 to other portions of the illustrated C-curve 200 provides better systemic tolerance of variations of retardance values, $\Gamma r$ and $\Gamma p$, thereby improving the manufacturability of the optical systems in which the disclosed compensators are employed. An exemplary solution range would be in those solutions on the C-curve where the orientation angle $\theta_1$ is less than approximately 20° and the orientation angle $\theta_1$ is greater than approximately 70° (e.g., in those areas where the C-curve 200 is flattening out). A wider-angle range would be where the orientation angle $\theta_1$ is less than approximately 30° and the orientation angle $\theta_1$ is greater than approximately 60°. The solutions closer to the 45° solution 205 have the disadvantage of requiring tighter tolerance on the in-plane retardance values in order to maintain the same the optical system components near their optimal orientations.

The above description and specifically Equation 1 describes solutions whereby the in-plane residual retardance of a panel $\Gamma p$ can be compensated in a reflective LC projection system by an optical component that has an in-plane retardance $\Gamma r$ equal to, or greater than, $\Gamma r$. Although in-plane compensation only may yield sufficient system performance, a more complete solution requires simultaneous out-of-plane panel compensation. The embodiments of this patent therefore consist of creating a compensating component that has one or more birefringent layers that has an in-plane retardance value greater than that of the panel and properties that can offer some (or indeed complete) out-of-plane compensation. This component can then be oriented in accordance with Equation 1 to ensure good in-plane compensation.

Figure 3:
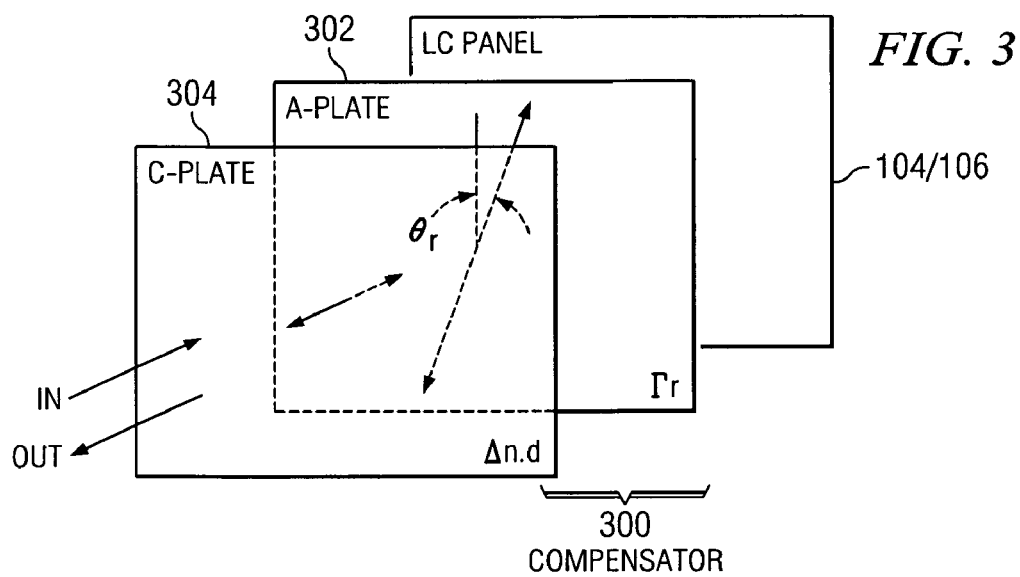
FIG. 3 illustrates a first embodiment compensator comprising separate a-plate and c-plate compensators.

FIG. 3 illustrates a system designed to compensate an LC panel's in-plane residual and out-of-plane retardance components. In order to compensate the off-axis rays, and thus improve field-of-view (FOV) performance, the retardance projected onto the plane normal to each ray's propagation direction by the LC layer's out-of-plane retardance must be subtracted. This is conventionally done by introducing negative birefringent plates whose optic axes are normal to the mean optical propagation. These birefringent plates are known as "c-plates," and they are set with retardances roughly matching the entire retardance of the panels being compensated ($\Delta n \cdot d \sim 250$ nm).

The approach of FIG. 3 illustrates one approach that attacks both in-plane and out-of-plane OFF-state LC panel compensation. This approach comprises a two-layer compensator 300 comprising an in-plane uniaxial compensator (a-plate) 302 complying with the 'head-on' criteria of Equation 2 and a c-plate 304. Conventional compensator solutions of this general structure are known. But known structures do not appreciate that choosing a relative orientation that is substantially removed from 45° may have surprising advantages. The present application, in contrast, recognizes the advantage of picking θr to be something other than 45°, and it applies this understanding to the disclosed two-layer compensator 300 of FIG. 3.

According to the approach of FIG. 3, incoming light is precompensated as it passes through the compensator 300. The a-plate 302 compensates for the OFF-state, in-plane residual retardance of the LC panel 104/106. The c-plate 304 compensates for the off-axis effects of the LC panel 104/106, and specifically will impart a certain retardance on incoming, off-normal light rays to minimize the FOV effects ultimately imparted upon the incoming light by the LC panel 104/106. The optical compensator 300 is designed to properly compensate in the composite after light has passed in through the compensator 300 and as it reflects backs back out after being reflected by the reflecting plane of the LC panel 104/106.

Figure 4:
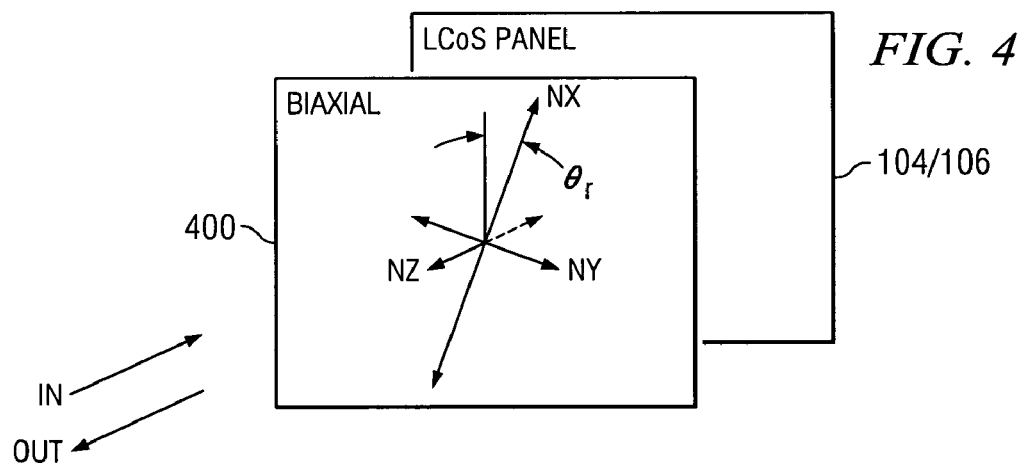
FIG. 4 illustrates a second embodiment compensator in which a single biaxial compensator is used to compensate for an LC panel.
Figure 5:
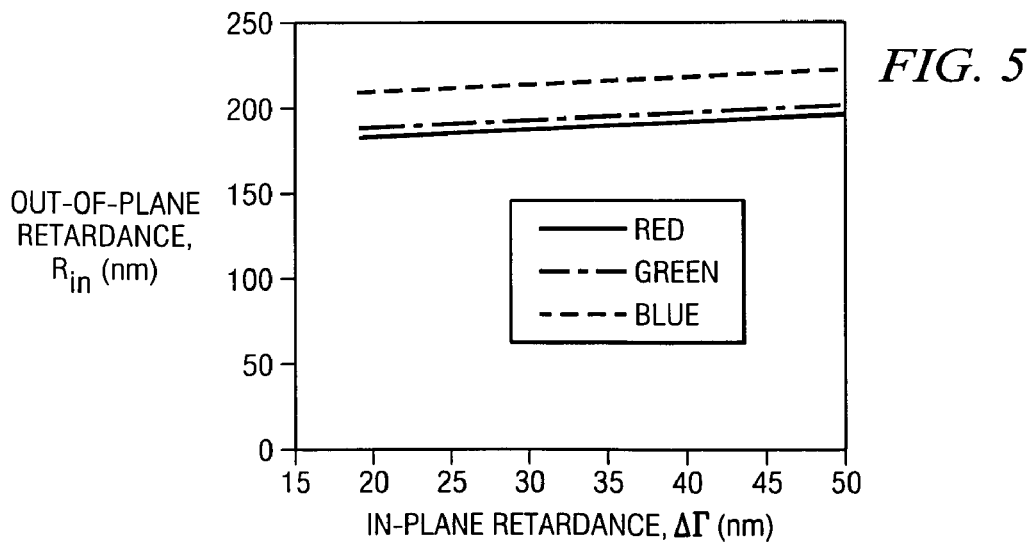
FIG. 5 is a graph illustrating the insensitivity of biaxial out-of-plane retardance for different in-plane compensation values.

FIG. 4 illustrates the combining of the a-plate and c-plate functionality into a single stretched biaxial film 400. Using a single stretched biaxial film has also been previously proposed by U.S. Patent Publication No. U.S. 2003/0128320, to Xiang-Dong Mi. However, as described above the present application is the first to recognize the advantage gained by choosing the off-45°, non-matched case for setting the in-plane OFF-state retardance compensation. The proper orientation of the biaxial film 400 can then be determined in a similar or analogous manner to that set forth above with respect to the a-plate/c-plate compensators. As shown in FIG. 5, the biaxial film 400 exhibits very consistent out-of-plane retardance over a wide range of in-plane retardances, so the film can be effectively oriented to compensate for both in-plane and out-of plane LC panel effects.

Figure 6:
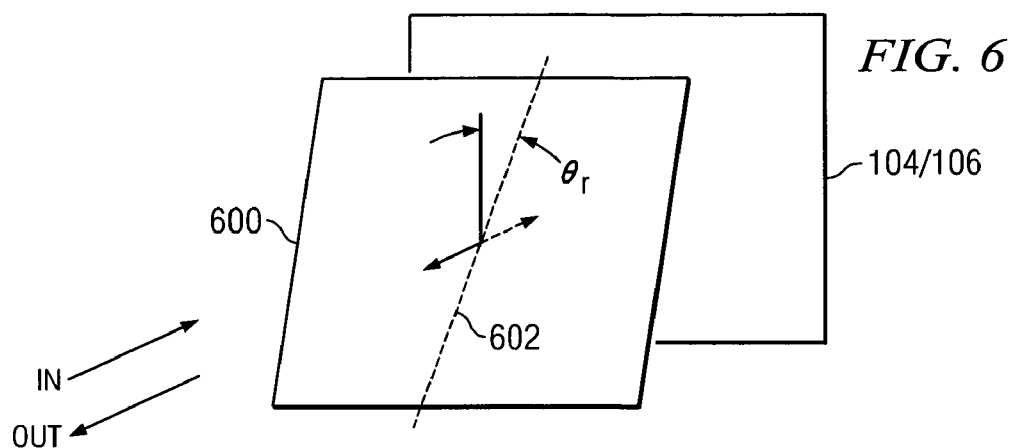
FIG. 6 illustrates a further embodiment compensator in which a single c-plate is tilted to provide in-plane compensation.

FIG. 6 illustrates another embodiment, which is a single-layer compensator in which a matched c-plate 600 is tilted along the axis 602 relative to the LC panel 104/106 to create some head-on retardance and oriented according to Equation 2. Under certain circumstances, this provides an efficient and relatively inexpensive approach, although it will not provide the same performance advantages that may be found in other solutions proposed in this application. For example, this approach can be unattractive from an imaging standpoint if the necessary tilt angle is too large, as the tilt can then induce unacceptable astigmatic aberration.

Figure 7:
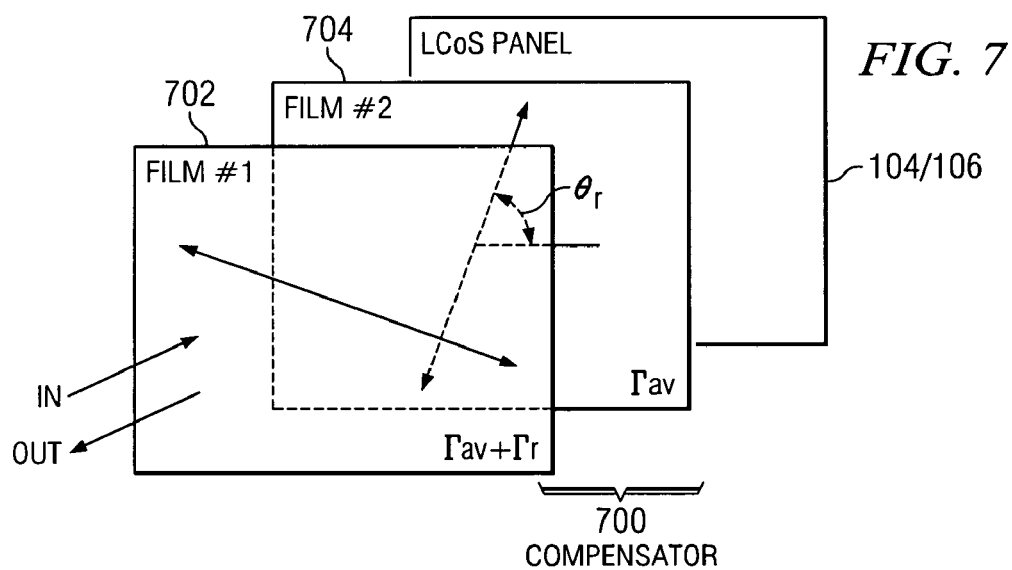
FIG. 7 illustrates a bi-layer compensator embodiment for compensating LC reflective panels.

FIG. 7 illustrates an approach in which a compensator 700 comprising two orthogonally oriented uniaxial layers ("a-plates") 702, 704 can compensate for both head-on and FOV leakage of the LC panel 104/106. It is known that identical crossed a-plates 702, 704 exhibit c-plate-like properties in planes containing the optic axes of the individual layers. The effective c-plate retardance is equivalent to that of the individual layers. As such, these crossed a-plates 702, 704 can be used to compensate the LC panel 104/106 in its predominantly homeotropic OFF-state. Since off-normal rays only experience undesired polarization mixing in planes other than those containing the polarizer and analyzer axes, and their worst polarization mixing occurs in those planes bisecting polarization/analyzer axes, orienting crossed a-plates 702, 704 such that their optic axes lie in these worst planes should help compensate these effects. This orientation does in fact compensate for these effects, but at the expense of the polarization mixing in the initially 'good' polarizer/analyzer planes. As a result, there is no net gain in transmissive LC systems where the crossed a-plates attempt to compensate in a single pass. In reflection, however, crossed a-plates 702, 704 behave differently. In particular, rays that experience polarization mixing in the planes bisecting the a-plate axes in a single pass have their polarization substantially restored in a second reflected pass. For this reason, a 45°-oriented, matched, crossed a-plate compensator 700 can effectively compensate the effect of an LC panel's 104/106 out-of-plane retardance.

Applicants have built upon the known use of a crossed a-plate compensator 700 to compensate the effect of an LC panel's 104/106 out-of-plane retardance and in-plane residual retardance in an efficient and manufacturable way. Specifically, applicants have used novel orientations and retardances of the retarder films 702, 704. These novel orientations and retardances are further explained below.

A compound two-layer compensator 700 made from orthogonally oriented birefringent layers 702, 704 whose retardances differ by Γp can compensate a reflective LC panel's FOV by choosing the average layer retardance to be close to Δn·d. A 45° orientation, coinciding with the compensator retardance being matched with the panel's OFF-state residual retardance, would be a known approach in this regard.

Applicants' novel approach involves choosing a certain retardance difference between the compound compensator's in-plane retardance and the panel's OFF-state residual retardance. In an embodiment, the retardance of the compensator 700 is greater than that of the panel 104/106. Head-on residual panel retardance is then compensated by orienting the part in accordance with Equation 2. It may further be advantageous to place the optic axis of the film with largest retardance closest to the polarization axis of the incoming light. For compensator angles away from 45°, the out-of-plane compensation favors smaller average retardance values. Further, in the case where a mismatched bi-layer compensator is incorporated into a reflective system, optimal performance is obtained when the layer with largest retardance faces away from the panel. The smaller retardance film is then closest the reflective panel.

Figure 10:
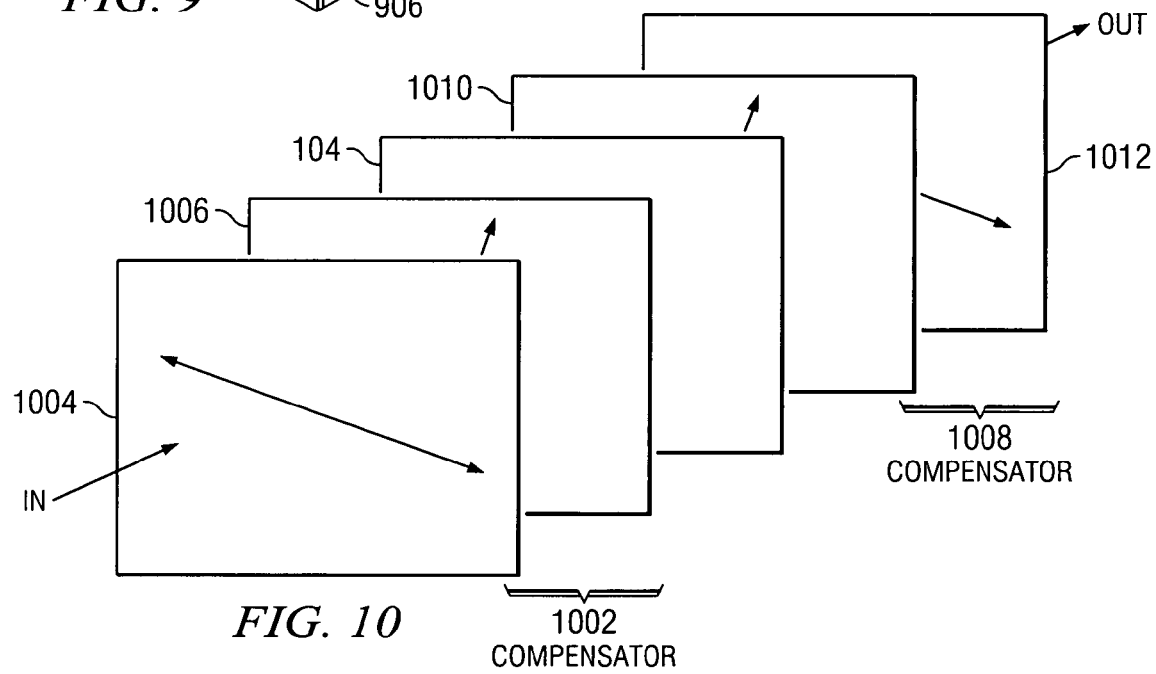
FIG. 10 illustrates an unfolded bi-layer compensated transmissive system.
Figure 11:
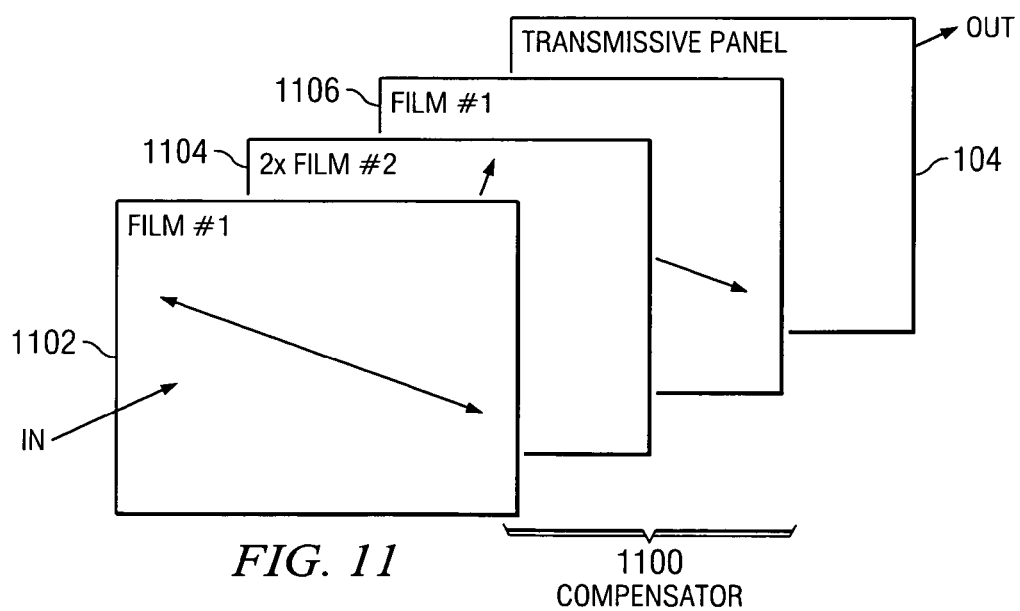
FIG. 11 illustrates a transmissive system based on the bi-layer reflective system in which the compensator pairs are placed on one side of the panel and combined into a single compensator.

As will be further described in FIGS. 10-11, related compensation schemes can be derived for transmissive panels. Taking the compensator elements described above for the reflective systems, these elements can be unfolded about the mirror plane of the LC panel and in some cases—particularly if the transmissive LC panel has reflective symmetry about its cell-center plane—an equivalent transmissive system can be formed.

Figure 8:
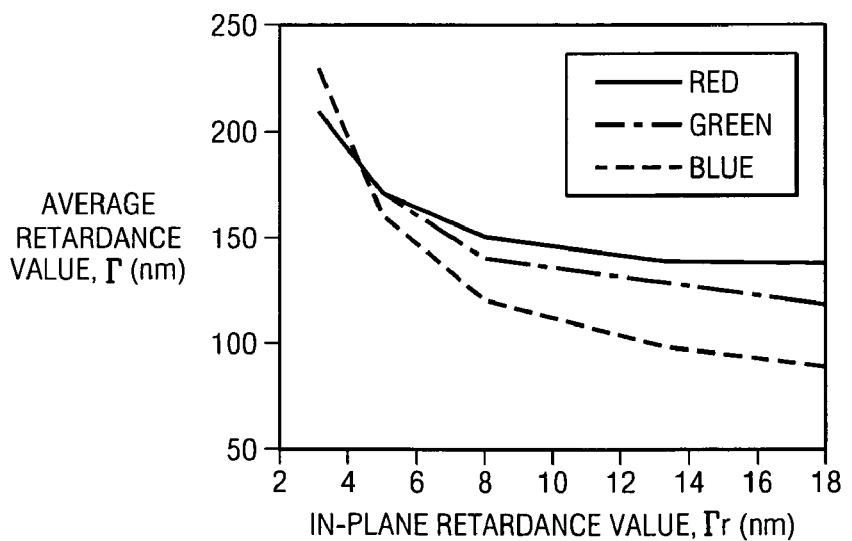
FIG. 8 shows the optimum average retardance value for a crossed a-plate compensator as a function of in-plane retardance, again for an exemplary 3 nm residual vertically aligned LCOS panel.

FIG. 8 graphically illustrates the optimal average retardance value of two crossed a-plate compensator embodiment for an exemplary 3 nm residual, Δn·d=250 nm, vertically aligned LCOS panel. An optimal average retardance is obtained as a result of compensating the panel's out-of-plane retardance component. Note that for above 10 nm of in-plane retardance, the average retardance is close to a quarter-wave value. Using this figure and the inventive approaches described in this patent specification, a designer can choose optimal retardance values for a compensator 102.

Figure 9:
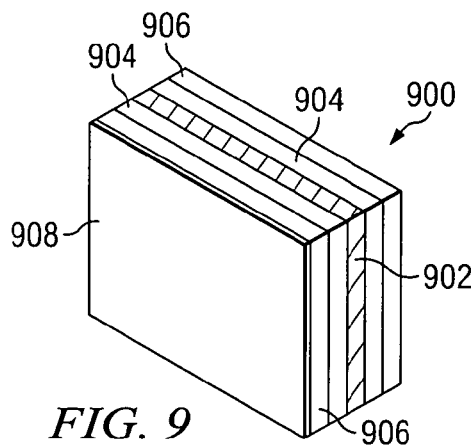
FIG. 9 illustrates a compensator constructed in accordance with disclosed manufacturing techniques.

FIG. 9 is a structural drawing of a compensator 900, illustrating a possible construction of the elements described in the present application. Centrally located within the laminate stack forming the compensator 900 is a dual retarder film laminate 902, where the dual retarder film 902 might be an a-plate and a c-plate or crossed a-plates. Adhesives 904 can be used to attach the dual retarder laminate 902 to glass end-caps 906. Further, an antireflective coating 908 can be applied to the glass end-caps 906. Further details of the described structure is further described in the provisional filing from which this application claims priority and in commonly owned patent application Ser. No. 10,908,740, entitled "High Durability And High Performance Polarization Optics Using a Low-Elasticity Organic Layer," which is hereby incorporated by reference herein.

FIG. 10 illustrates an unfolded transmissive embodiment in which the discussed reflective compensation schemes can be utilized on either side of a transmissive panel 104. Specifically the bi-layer compensator of FIG. 7 is shown unfolded, with compensators 1002, 1008 on either side of the transmissive panel 104. This approach works optimally for panels 104 with reflective symmetry about the cell center. In cases where panels are asymmetric, one or more of the compensators 1002, 1008 may be tilted about an in-plane axis to accommodate. The bi-layers of each compensator 1002, 1008 are represented by the individually drawing layers 1004, 1006, 1010 and 1012. As mentioned, this unfolded compensator works in the same way as the reflective bi-layer of FIG. 7, except instead of each compensator layer acting on the light twice (once incoming and once reflected), the light will only pass through each respective layer once.

Figure 12A:
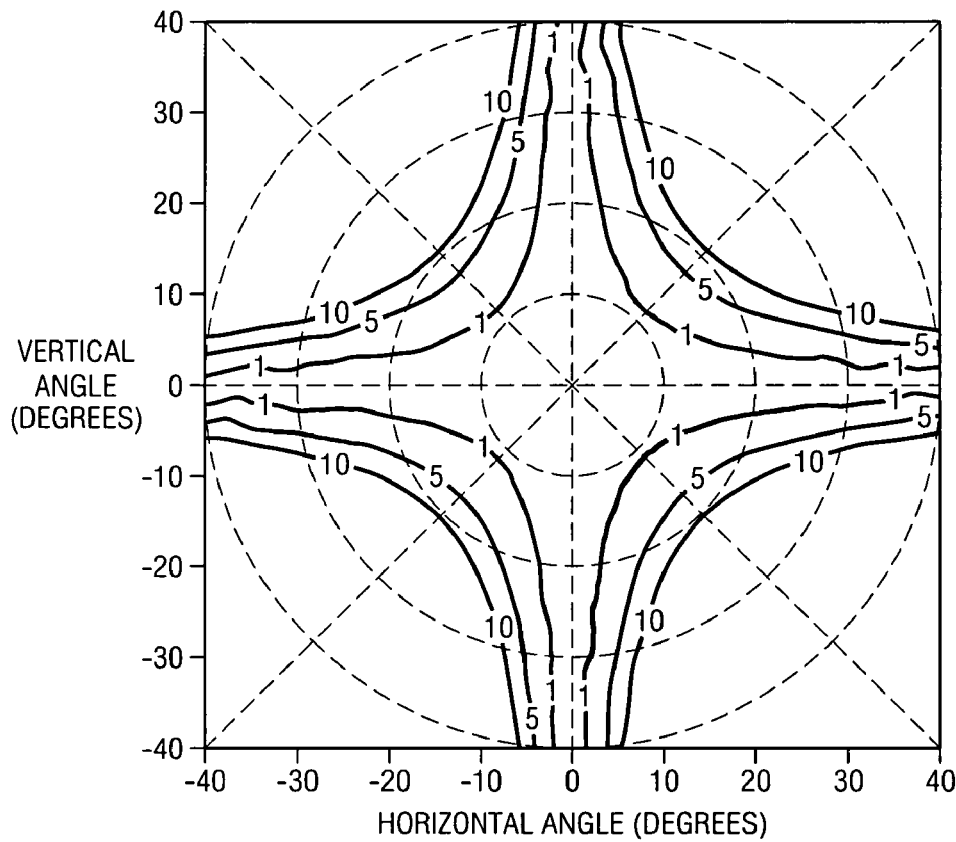
FIGS. 12a-b are exemplary field-of-view diagrams showing respectively the FOV at 550 nm of an uncompensated transmissive homeotropic aligned LC panel and one that is compensated using the approach of FIG. 11.
Figure 12B:
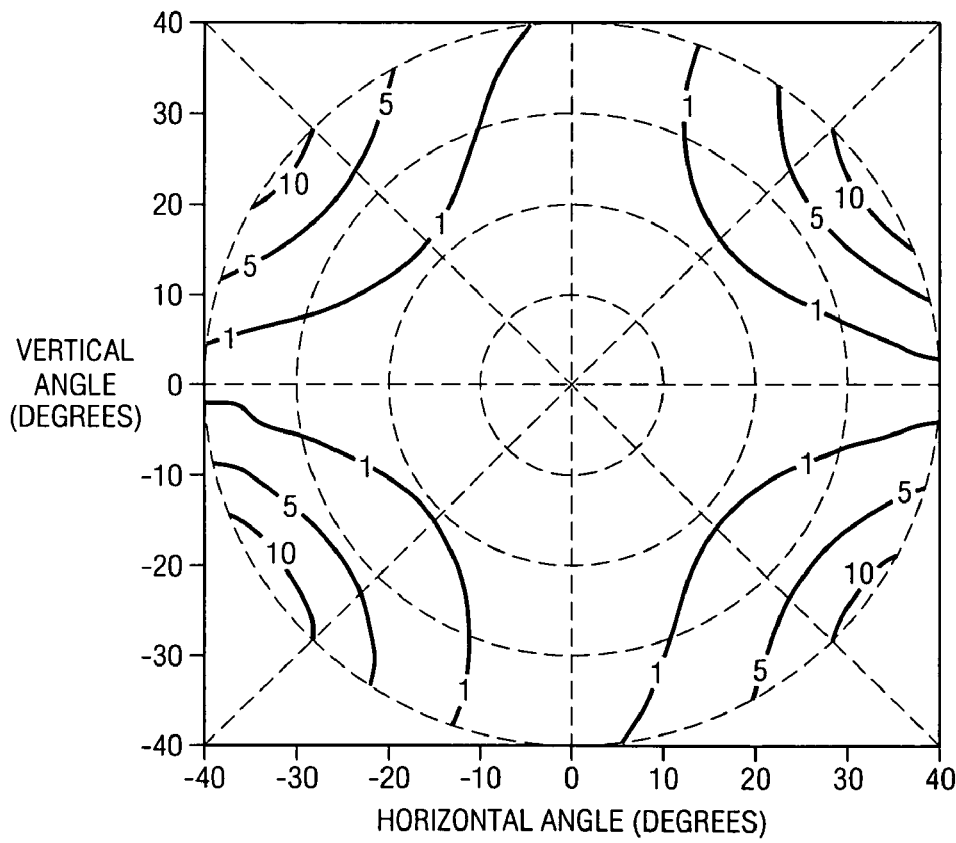

FIG. 11 illustrates an embodiment in which the compensator 1008 that was at the exit of the unfolded system of FIG. 11 is combined with the front compensator 1002 to form a three-layer compensation element 1100. Note that this approach essentially preserves the order in which the light passes through the previously four layers, but since the layers 1006 and 1010 were essentially identical layers in the FIG. 10 embodiment, they are lumped together as layer 1104, which then has two times its normal retardance in the FIG. 111 embodiment. All of the 3 layers precede the panel 104 to form the trilyaer compensator 1100. The excellent performance of this compensator 1110 is clearly shown in FIG. 12*a-b*, where field-of-view (FOV) plots are given for uncompensated and compensated perfect homeotropic transmissive panels.

With further reference to the transmissive solutions of FIGS. 10-11, in many cases the transmissive panels will not have reflective symmetry about their cell-center planes, and accordingly a transmissive profile may not exist that would be equivalent to a reflective solution. Transmissive pi-cells, however, have a reflection symmetry that can be compensated in this manner.

Other LC panels that are almost symmetric about the their cell-center planes are those that have minimal residual in-plane OFF-state retardance. An example of this would be a vertically aligned LC mode with very small pre-tilt angle (e.g., <2°) away from the substrate normal. Another example would be a twisted vertically aligned mode where the net projected in-plane retardance is very small.

In these low residual cases, where the transmissive panel is effectively homeotropic in nature, the paired compensators can be brought together on a single side of the panel forming a single compensating element consisting of one or more layers. A single layer can be realized by combining equivalent layers such as two equivalent biaxial films. In this case we can compensate in a conventional way a low residual effectively homeotropic transmissive LC with a matched biaxial film with very low in-plane retardance (effectively a c-plate).

Still referring to the transmissive embodiments of FIGS. 10-11, it is further possible as another embodiment to use a three-layer orthogonally oriented $\Delta n \cdot d / 2 \times \Delta n \cdot d / \Delta n \cdot d$ compensator with layer axes bisecting the polarizer and analyzer axes. This is the equivalent of the matched bi-layer compensator above, but applied in a low residual unfolded transmissive system.

For transmissive panels having a significant pretilt, the equivalence to an unfolded LC system is lost. However compensation schemes can be derived by first unfolding the reflective case assuming perfect homeotropic alignment and second by tilting the compensator in accordance with the tilt of the LC. By way of example, a simple c-plate can be used to compensate a tilted transmissive vertically aligned nematic LC panel by tilting the plate to align the out-of-plane optic axis of the plate to that of the LC. In practice, the ray deflection at material interfaces should be taken into account making the angle of the plate not match exactly with the LC director.

Solutions can be derived in the case of compensating finite in-plane residual retardance of a transmissive panel with reflective symmetry such as a pi-cell. Unlike in the reflective case, however, only one solution exists where the input and output polarization are the same. In the case of a tilted, vertically aligned LC system, this would be the matched 45° solution. It is possible, however, to rotate the output analyzer in the transmissive system as the polarizer and analyzer are physically separate. Good contrast can therefore be achieved if the output polarization is linear. This is the same condition as for the solution set determined in Equations 1 and 2. Compensators with in-plane retardances greater than the panels' residuals can therefore be used for in-plane compensation assuming rotation of the output analyzer. The analyzer angle for any given solution can be derived using expressions similar to those used in Equation 1.

As described above, field-of-view compensation can then be independently addressed with average retardance values using the equivalence of transmissive to unfolded reflective systems. While the unfolded systems can most easily be applied to systems using crossed a-plates (or other systems not having tilted plates), through design techniques it is possible to develop transmissive systems following many of the reflective architectures described above.

The section headings in this application are provided for consistency with the parts of an application suggested under 37 CFR 1.77 or otherwise to provide organizational cues. These headings shall not limit or characterize the invention(s) set out in any patent claims that may issue from this application. Specifically and by way of example, although the headings may refer to a "Field of the Invention," the claims should not be limited by the language chosen under this heading to describe the so-called field of the invention. Further, a description of a technology in the "Background" or "Description of Related Art" is not be construed as an admission that technology is prior art to the present application. Neither is the "Summary of the Invention" to be considered as a characterization of the invention(s) set forth in the claims to this application. Further, the reference in these headings to "Invention" in the singular should not be used to argue that there is a single point of novelty claimed in this application. Multiple inventions may be set forth according to the limitations of the multiple claims associated with this patent specification, and the claims accordingly define the invention(s) that are protected thereby. In all instances, the scope of the claims shall be considered on their merits in light of the specification but should not be constrained by the headings included in this application.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components and operations are illustrated in the context of specific configurations. Other allocations of functionality are envisioned and will fall within the scope of claims that follow. Structures and functionality presented as discrete components in the exemplary configurations may be implemented as a combined structure or component. These and other variations, modifications, additions, and improvements may fall within the scope of the invention as defined in the claims that follow.

The compensating stacks described herein may be made from any suitable material such as solid crystals, stretched polymers, liquid crystal polymers, or another material. The liquid crystal polymer can have dual homogeneous alignment, splay alignment (homogeneous/homeotropic) or any suitable alignment. Although the compensated retarder stacks are discussed in the context of color management for projection display, they can be used in a number of applications. These include, among others, color separation for image capture or radiometry, lighting, and near infrared optical communications.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

What is claimed is:

1. An optical component operable to be associated with an LC panel, the optical component comprising a birefringent film that has first and second optic axes, whereby the birefringent film is operable to compensate for both the LC panel's in-plane dark-state retardance and for field-of-view variations of the LC panel in a certain optical projection system when the birefringent film is oriented wherein the in-plane effective optic axis of the birefringent film is at an angle substantially other than 90 degrees from the effective optic axis of the off-state residual retardance of the LC panel.

2. The optical component of claim 1, wherein the birefringent film is biaxially stretched to impart the first and second optic axes.

3. The optical component of claim 1, wherein the birefringent film is a low-elasticity organic film.

4. The optical component of claim 1, wherein the birefringent film is a stretched polymer.

5. The optical component of claim 1, wherein the birefringent film is oriented relative to the LC panel to provide at least some compensation for field-of-view variations in an optical projection system in which the birefringent LC panel is used.

6. The optical component of claim 1, wherein the birefringent film is configured to compensate for a vertically aligned nematic LC panel.

7. The optical component of claim 1, wherein the optical component is designed to be oriented in an optical projection system according to the formula $$(0\ 0\ 1) \cdot \left[ \begin{pmatrix} \cos(2 \cdot \theta r) & \sin(2 \cdot \theta r) & 0 \\ -\sin(2 \cdot \theta r) & \cos(2 \cdot \theta r) & 0 \\ 0 & 0 & 1 \end{pmatrix} \cdot \right.$$

$$\begin{pmatrix} 1 & 0 & 0 \\ 0 & \cos\left(\frac{2 \cdot \pi \cdot \Gamma r}{\lambda}\right) & -\sin\left(\frac{2 \cdot \pi \cdot \Gamma r}{\lambda}\right) \\ 0 & \sin\left(\frac{2 \cdot \pi \cdot \Gamma r}{\lambda}\right) & \cos\left(\frac{2 \cdot \pi \cdot \Gamma r}{\lambda}\right) \end{pmatrix} \cdot$$

$$\left. \begin{pmatrix} \cos(2 \cdot \theta r) & -\sin(2 \cdot \theta r) & 0 \\ \sin(2 \cdot \theta r) & \cos(2 \cdot \theta r) & 0 \\ 0 & 0 & 1 \end{pmatrix} \right] \cdot$$

$$\begin{pmatrix} \cos(2 \cdot \varepsilon) \cdot \cos(2 \cdot \phi) \\ \cos(2 \cdot \varepsilon) \cdot \sin(2 \cdot \phi) \\ \sin(2 \cdot \varepsilon) \end{pmatrix} = 0$$

(Equation 1)

where $\phi$ and $\varepsilon$ are the orientation and ellipticity angles describing the polarized state transformed from the input polarization by the LC layer panel, where $\Gamma r$ and $\theta r$ are the in-plane retardance and orientation of the optical component, and where $\lambda$ is the wavelength of the compensated light, and wherein $\theta r$ is further chosen to be substantially unequal to 45 degrees.

8. An optical component operable to be associated with an LC panel, the optical component comprising a birefringent film that has first and second optic axes, whereby the single biaxial film is operable to compensate for both the LC panel's in-plane dark-state retardance and for field-of-view variations of the LC panel in a certain optical projection system, the optical component designed to be oriented in an optical projection system according to the formula $$(0\ 0\ 1) \cdot \left[ \begin{pmatrix} \cos(2 \cdot \theta r) & \sin(2 \cdot \theta r) & 0 \\ -\sin(2 \cdot \theta r) & \cos(2 \cdot \theta r) & 0 \\ 0 & 0 & 1 \end{pmatrix} \cdot \right.$$

$$\begin{pmatrix} 1 & 0 & 0 \\ 0 & \cos\left(\frac{2 \cdot \pi \cdot \Gamma r}{\lambda}\right) & -\sin\left(\frac{2 \cdot \pi \cdot \Gamma r}{\lambda}\right) \\ 0 & \sin\left(\frac{2 \cdot \pi \cdot \Gamma r}{\lambda}\right) & \cos\left(\frac{2 \cdot \pi \cdot \Gamma r}{\lambda}\right) \end{pmatrix} \cdot$$

$$\left. \begin{pmatrix} \cos(2 \cdot \theta r) & -\sin(2 \cdot \theta r) & 0 \\ \sin(2 \cdot \theta r) & \cos(2 \cdot \theta r) & 0 \\ 0 & 0 & 1 \end{pmatrix} \right] \cdot$$

$$\begin{pmatrix} \cos(2 \cdot \varepsilon) \cdot \cos(2 \cdot \phi) \\ \cos(2 \cdot \varepsilon) \cdot \sin(2 \cdot \phi) \\ \sin(2 \cdot \varepsilon) \end{pmatrix} = 0$$

(Equation 1)

where $\phi$ and $\varepsilon$ are the orientation and ellipticity angles describing the polarized state transformed from the input polarization by the LC layer panel, where $\Gamma r$ and $\theta r$ are the in-plane retardance and orientation of the optical component, and where λ is the wavelength of the compensated light, and wherein θr is further chosen to be substantially unequal to 45 degrees.

9. The optical component of claim 8, wherein the birefringent film is biaxially stretched to impart the first and second optic axes.

10. The optical component of claim 8, wherein the birefringent film is a low-elasticity organic film.

11. The optical component of claim 8, wherein the birefringent film is a stretched polymer.

* * * * *